(12) United States Patent
Jung et al.

(10) Patent No.: US 8,311,733 B2
(45) Date of Patent: Nov. 13, 2012

(54) INTERACTIVE KEY FRAME IMAGE MAPPING SYSTEM AND METHOD

(75) Inventors: Edward K. Y. Jung, Bellevue, WA (US);
Robert W. Lord, Seattle, WA (US);
Royce A. Levien, Lexington, MA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1968 days.

(21) Appl. No.: 11/058,399

(22) Filed: Feb. 15, 2005

(65) Prior Publication Data
US 2006/0181546 A1    Aug. 17, 2006

(51) Int. Cl.
G06F 19/00    (2006.01)
G01C 21/00    (2006.01)
G01C 11/08    (2006.01)

(52) U.S. Cl. ........ 701/409; 345/625; 345/638; 345/641; 345/644

(58) Field of Classification Search .................. 701/208, 701/211, 212, 207, 213, 400, 408, 28, 409, 701/412, 418; 707/530, 517, 501.01, 5, 100, 707/10; 715/526, 507, 501.01; 348/333.02, 348/207, 143; 358/1.15, 403, 444; 705/1, 705/10; 386/46, 96; 345/638, 619, 620, 345/625, 634, 641, 644
See application file for complete search history.

(56) References Cited

U.S. PATENT DOCUMENTS

| | | |
|---|---|---|
| 4,301,506 A | 11/1981 | Turco |
| 4,528,552 A | 7/1985 | Moriyama et al. |
| 4,546,439 A | 10/1985 | Esparza |
| 4,570,227 A | 2/1986 | Tachi et al. |
| 4,646,089 A | 2/1987 | Takanabe et al. |
| 4,734,863 A | 3/1988 | Honey et al. |
| 4,764,873 A | 8/1988 | Libby |
| 4,796,189 A | 1/1989 | Nakayama et al. |
| 4,866,626 A | 9/1989 | Egli |
| 4,876,651 A | 10/1989 | Dawson et al. |
| 4,890,104 A | 12/1989 | Takanabe et al. |

(Continued)

OTHER PUBLICATIONS

Jonathan W. Lowe, "Raster-Oriented Technology Supports Public Internet Applications That Manage Large Raster Collections," Geospatial Solutions (Oct. 2004) (4 pages).

(Continued)

*Primary Examiner* — Ronnie Mancho

(57) ABSTRACT

Provided is a computer system and method for providing key frame image mapping. A method includes collecting one or more images of a predetermined area on the map of a physical location; and organizing the one or more images on the map as a function of a time, location, and/or image history parameter. A computer system includes a mapping module including a data store configurable to organize one or more images according to locations on a map and a table. The table can associate metadata for images with a time line, an image history and/or a location. The association can enable an instantiation of a time-related image from images at locations of the map. The mapping module enables a personalized iconographic map of a physical location illustrating icons associated with a catalog of images that are incorporated with the time line. The time line can be associated with a trip taken to an area in a map such that scrolling the time line automatically causes images associated with that time appear as well as the location on the map wherein the picture was taken.

7 Claims, 4 Drawing Sheets

U.S. PATENT DOCUMENTS

| | | | |
|---|---|---|---|
| 4,914,605 A | 4/1990 | Loughmiller et al. | |
| 4,926,336 A | 5/1990 | Yamada | |
| 4,937,753 A | 6/1990 | Yamada | |
| 4,954,958 A | 9/1990 | Savage et al. | |
| 4,962,458 A | 10/1990 | Verstraete | |
| 4,984,168 A | 1/1991 | Neukrichner et al. | |
| 5,031,104 A | 7/1991 | Ikeda et al. | |
| 5,041,983 A | 8/1991 | Nakahara et al. | |
| 5,067,081 A | 11/1991 | Person | |
| 5,115,399 A | 5/1992 | Nimura et al. | |
| 5,168,452 A | 12/1992 | Yamada et al. | |
| 5,170,353 A | 12/1992 | Verstraete | |
| 5,172,321 A | 12/1992 | Ghaem et al. | |
| 5,189,430 A | 2/1993 | Yano et al. | |
| 5,191,406 A | 3/1993 | Brandestini et al. | |
| 5,191,532 A | 3/1993 | Moroto et al. | |
| 5,231,584 A | 7/1993 | Nimura et al. | |
| 5,270,937 A | 12/1993 | Link et al. | |
| 5,274,387 A | 12/1993 | Kikihara et al. | |
| 5,293,163 A | 3/1994 | Kakihara et al. | |
| 5,802,526 A | 9/1998 | Fawcett et al. | |
| 5,844,570 A | 12/1998 | Curtright et al. | |
| 5,884,262 A | 3/1999 | Wise et al. | |
| 5,948,040 A | 9/1999 | DeLorme et al. | |
| 6,009,403 A | 12/1999 | Sato | |
| 6,084,882 A | 7/2000 | Ogura et al. | |
| 6,104,790 A | 8/2000 | Narayanaswami | |
| 6,119,095 A | 9/2000 | Morita | |
| 6,133,947 A * | 10/2000 | Mikuni | 348/143 |
| 6,240,360 B1 | 5/2001 | Phelan | |
| 6,282,362 B1 * | 8/2001 | Murphy et al. | 386/224 |
| 6,282,489 B1 | 8/2001 | Bellesfield et al. | |
| 6,321,158 B1 | 11/2001 | DeLorme et al. | |
| 6,347,299 B1 | 2/2002 | Holzman et al. | |
| 6,381,534 B2 | 4/2002 | Takayama et al. | |
| 6,437,797 B1 * | 8/2002 | Ota | 345/638 |
| 6,493,428 B1 | 12/2002 | Hillier | |
| 6,496,842 B1 | 12/2002 | Lyness | |
| 6,498,982 B2 | 12/2002 | Bellesfield et al. | |
| 6,542,593 B1 | 4/2003 | Bowman-Amuah | |
| 6,553,309 B2 | 4/2003 | Uchida et al. | |
| 6,570,595 B2 | 5/2003 | Porter | |
| 6,636,803 B1 * | 10/2003 | Hartz et al. | 701/208 |
| 6,680,999 B1 | 1/2004 | Garcia | |
| 6,697,825 B1 * | 2/2004 | Underwood et al. | 715/207 |
| 6,718,017 B1 | 4/2004 | Price et al. | |
| 6,728,731 B2 | 4/2004 | Sarukkai et al. | |
| 6,731,625 B1 | 5/2004 | Eastep et al. | |
| 6,741,790 B1 * | 5/2004 | Burgess | 386/227 |
| 6,801,604 B2 | 10/2004 | Maes et al. | |
| 6,816,779 B2 | 11/2004 | Chen et al. | |
| 6,826,474 B2 | 11/2004 | Miyahara et al. | |
| 6,839,023 B1 | 1/2005 | Benco et al. | |
| 6,868,333 B2 | 3/2005 | Melen | |
| 7,058,507 B2 | 6/2006 | Saiki | |
| 7,152,207 B1 * | 12/2006 | Underwood et al. | 715/207 |
| 7,236,173 B2 | 6/2007 | Chithambaram et al. | |
| 7,292,935 B2 | 11/2007 | Yoon | |
| 7,423,771 B2 * | 9/2008 | Ohata et al. | 358/1.15 |
| 7,698,336 B2 * | 4/2010 | Nath | 707/737 |
| 7,990,455 B2 * | 8/2011 | Iga | 348/333.02 |
| 2002/0174003 A1 | 11/2002 | Redmann et al. | |
| 2003/0134648 A1 | 7/2003 | Reed et al. | |
| 2004/0015293 A1 | 1/2004 | Randazzo et al. | |
| 2004/0054428 A1 | 3/2004 | Sheha et al. | |
| 2004/0172192 A1 | 9/2004 | Knutson | |
| 2004/0177319 A1 * | 9/2004 | Horn | 715/501.1 |
| 2004/0193707 A1 | 9/2004 | Alan | |
| 2004/0217884 A1 | 11/2004 | Samadani et al. | |
| 2004/0224703 A1 | 11/2004 | Takaki et al. | |
| 2004/0254723 A1 | 12/2004 | Tu | |
| 2005/0027705 A1 * | 2/2005 | Sadri et al. | 707/5 |
| 2005/0032556 A1 | 2/2005 | Bennett et al. | |
| 2005/0072116 A1 | 4/2005 | Bunte | |
| 2005/0102099 A1 | 5/2005 | Linn | |
| 2005/0102245 A1 | 5/2005 | Edlund et al. | |
| 2005/0131643 A1 | 6/2005 | Shaffer et al. | |
| 2005/0216186 A1 * | 9/2005 | Dorfman et al. | 701/207 |
| 2006/0040670 A1 | 2/2006 | Li et al. | |
| 2006/0058948 A1 | 3/2006 | Blass et al. | |
| 2006/0168592 A1 | 7/2006 | Andrews et al. | |

OTHER PUBLICATIONS

Joachim Bobrich, et al., "Augented Maps," Symposium on Geospatial Theory, Processing and Applications; Univ. of Hanover, 2002.

Gluck, Myke, Ph.D., et al., "Augemented Seriation: Usability of a Visual and Auditory Tool for Geographic Pattern Discovery wth Risk Perception Data," GeoComputation 1999; p. 1.

Introduction to Augmented Reality; www.se.rit.edu/-jrv/research/ar/introction html; printed Dec. 15, 2004; 11 pages.

Seattle Area Traffic Home, web page, Dec. 10, 2004, 11:14 A.M., www.wsdot.wa.gov/traffic/seattle.

Hall, T. Brett et al., "A Novel Interactivity Environment for Integrated Intelligent Transportation and Telematic Systems", 5th Intl. IEEE Conf., Singapore, Sep. 3, 2002.

Wei, Li-Yi and LeVoy, Marc; "Fast Texture Synthesis Using Tree-Structured Vector Quantization," Stanford University, pp. 1-10.

Zhong, David X.; "Color Space Analysis and Color Image Segmentation," School of Electrical and Information Engineering, The University of Sydney, pp. 1-5.

Espatial: iSMART Overview; located at www.espatial.com/page455.html bearing a date of Feb. 8, 2005 (3 pp.).

U.S. Appl. No. 11/124,626, Jung et al.
U.S. Appl. No. 11/047,465, Jung et al.
U.S. Appl. No. 11/066,112, Jung et al.
U.S. Appl. No. 11/050,642, Jung et al.
U.S. Appl. No. 11/086,973, Jung et al.
U.S. Appl. No. 11/998,450, Jung et al.
U.S. Appl. No. 11/998,827, Jung et al.
U.S. Appl. No. 11/998,871, Jung et al.
U.S. Appl. No. 12/231,314, Jung et al.
U.S. Appl. No. 12/231,325, Jung et al.

* cited by examiner

INTERACTIVE KEY FRAME IMAGE MAPPING SYSTEM AND METHOD

TECHNICAL FIELD

The present application relates generally to maps.

SUMMARY

In one aspect, a method includes collecting one or more images of a predetermined area on the map; and organizing the one or more images on the map as a function of a time, a location and/or an image history parameter. The method can further include displaying a key frame associated with the location on the map, the key frame providing access to at least one of the one or more images.

The organizing the one or more images on the map as a function of a time, a location and/or an image history parameter can further include causing the one or more images to be organized by time and location; and enabling the one or more images to be accessed via a time line. In another embodiment, the organizing the one or more images on the map as a function of a time, a location and/or an image history parameter can include organizing the one or more images as icons displayed on the map. The organizing the one or more images on the map as a function of a time, a location and/or an image history parameter can also include designating one of the one or more images as an at least one key frame associated with at least one location on the map.

The collecting one or more images of a predetermined area on the map can include collecting the one or more images from one or more public and/or one or more private cameras.

In one embodiment, the method includes correlating the time line with the map and the one or more images, the time line enabling display of at least one of the one or more images. In an embodiment, the time line can enable display of at least one of the one or more images by instantiating a display upon clicking and/or scrolling over the time line via a user interface. In addition to the foregoing, other method aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to a processor; a memory coupled to the processor; a mapping module coupled to the memory, wherein the mapping module includes a data store configurable to organize one or more images according to one or more locations on a map; and a table coupled to the data store, the table configurable to associate metadata for the one or more images with a time line, the association to enable an instantiation of a time-related image from the one or more images at the one or more locations on the map. In addition to the foregoing, other system aspects are described in the claims, drawings, and text forming a part of the present application.

In one aspect a computer program product includes a computer readable medium configured to perform one or more acts for displaying a map with the acts including but not limited to collecting one or more images of a predetermined area on the map; and organizing the one or more images on the map as a function of a time, a location and/or an image history.

In another aspect, a computer program product includes a computer readable medium configured to perform one or more acts for displaying a map, with the acts including but not limited to collecting one or more images of a predetermined area on the map, organizing the one or more images to be accessible via the map, the organizing being a function of a time, a location and/or an image history parameter associated with a time line and the location on the map; and displaying a key frame image representative of the location on the map, the key frame providing access to the one or more images.

In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject described herein will become apparent in the text set forth herein.

BRIEF DESCRIPTION OF THE DRAWINGS

A better understanding of the subject matter of the present application can be obtained when the following detailed description of the disclosed embodiments is considered in conjunction with the following drawings, in which.

DETAILED DESCRIPTION OF THE DRAWINGS

Those with skill in the computing arts will recognize that the disclosed embodiments have relevance to a wide variety of applications and architectures in addition to those described below. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

Figure 1:
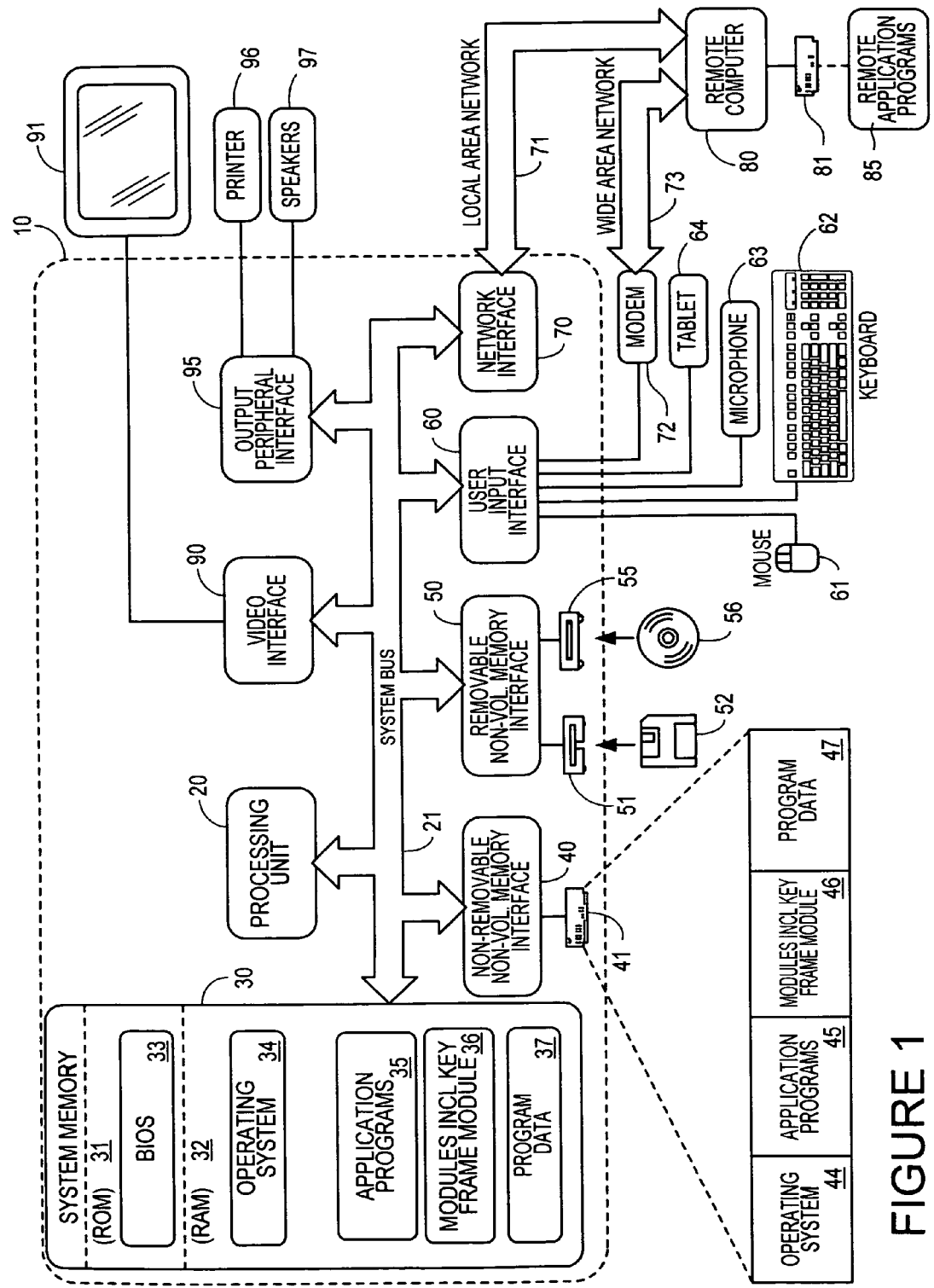
FIG. 1 is a block diagram of an exemplary computer architecture that supports the claimed subject matter.

With reference to FIG. 1, an exemplary computing system for implementing the embodiments and includes a general purpose computing device in the form of a computer 10. Components of the computer 10 may include, but are not limited to, a processing unit 20, a system memory 30, and a system bus 21 that couples various system components including the system memory to the processing unit 20. The system bus 21 may be any of several types of bus structures including a memory bus or memory controller, a peripheral bus, or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 10 typically includes a variety of computer readable media. Computer readable media can be any available media that can be accessed by the computer 10 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 10. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 30 includes computer storage media in the form of volatile and/or nonvolatile memory such as read only memory (ROM) 31 and random access memory (RAM) 32. A basic input/output system 33 (BIOS), containing the basic routines that help to transfer information between elements within computer 10, such as during start-up, is typically stored in ROM 31. RAM 32 typically contains data and/or program modules that are immediately accessible to and/or presently being operated on by processing unit 20. By way of example, and not limitation, FIG. 1 illustrates operating system 34, application programs 35, other program modules 36 and program data 37. FIG. 1 is shown with program modules 36 including a imaging module in accordance with an embodiment as described herein.

The computer 10 may also include other removable/non-removable, volatile/nonvolatile computer storage media. By way of example only, FIG. 1 illustrates a hard disk drive 41 that reads from or writes to non-removable, nonvolatile magnetic media, a magnetic disk drive 51 that reads from or writes to a removable, nonvolatile magnetic disk 52, and an optical disk drive 55 that reads from or writes to a removable, non-volatile optical disk 56 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 41 is typically connected to the system bus 21 through a non-removable memory interface such as interface 40, and magnetic disk drive 51 and optical disk drive 55 are typically connected to the system bus 21 by a removable memory interface, such as interface 50 unless context dictates otherwise. In some cases, an interface may include a location for electronically attaching additional parts to the computer 10, unless context dictates otherwise.

The drives and their associated computer storage media, discussed above and illustrated in FIG. 1, provide storage of computer readable instructions, data structures, program modules and other data for the computer 10. In FIG. 1, for example, hard disk drive 41 is illustrated as storing operating system 44, application programs 45, other program modules 46 and program data 47. Program modules 46 is shown including an imaging module, which can be configured as either located in modules 36 or 46, or both locations, as one with skill in the art will appreciate. More specifically, imaging modules 36 and 46 could be in non-volatile memory in some embodiments wherein such an imaging module runs automatically in an environment. In other embodiments, imaging modules could be part of a personal imaging system on a hand-held device such as a personal digital assistant (PDA) and exist only in RAM-type memory.

Note that these components can either be the same as or different from operating system 34, application programs 35, other program modules 36, and program data 37. Operating system 44, application programs 45, other program modules 46, and program data 47 are given different numbers hereto illustrate that, at a minimum, they are different copies. A user may enter commands and information into the computer 10 through input devices such as a tablet, or electronic digitizer, 64, a microphone 63, a keyboard 62 and pointing device 61, commonly referred to as a mouse, trackball or touch pad. Other input devices (not shown) may include a joystick, game pad, satellite dish, scanner, or the like. These and other input devices are often connected to the processing unit 20 through a user input interface 60 that is coupled to the system bus, but may be connected by other interface and bus structures, such as a parallel port, game port or a universal serial bus (USB). A monitor 91 or other type of display device is also connected to the system bus 21 via an interface, such as a video interface 90. The monitor 91 may also be integrated with a touch-screen panel or the like. Note that the monitor and/or touch screen panel can be physically coupled to a housing in which the computing device 10 is incorporated, such as in a tablet-type personal computer. In addition, computers such as the computing device 10 may also include other peripheral output devices such as speakers 97 and printer 96, which may be connected through an output peripheral interface 95 or the like.

The computer 10 may operate in a networked environment using logical connections to one or more remote computers, such as a remote computer 80. The remote computer 80 may be a personal computer, a server, a router, a network PC, a peer device or other common network node, and typically includes many or all of the elements described above relative to the computer 10, although only a memory storage device 81 has been illustrated in FIG. 1. The logical connections depicted in FIG. 1 include a local area network (LAN) 71 and a wide area network (WAN) 73, but may also include other networks. Such networking environments are commonplace in offices, enterprise-wide computer networks, intranets and the Internet. For example, in the subject matter of the present application, the computer system 10 may comprise the source machine from which data is being migrated, and the remote computer 80 may comprise the destination machine. Note however that source and destination machines need not be connected by a network or any other means, but instead, data may be migrated via any media capable of being written by the source platform and read by the destination platform or platforms.

When used in a LAN or WLAN networking environment, the computer 10 is connected to the LAN through a network interface or adapter 70. When used in a WAN networking environment, the computer 10 typically includes a modem 72 or other means for establishing communications over the WAN 73, such as the Internet. The modem 72, which may be internal or external, may be connected to the system bus 21 via the user input interface 60 or other appropriate mechanism. In a networked environment, program modules depicted relative to the computer 10, or portions thereof, may be stored in the remote memory storage device. By way of example, and not limitation, FIG. 1 illustrates remote application programs 85 as residing on memory device 81. It will be appreciated that the network connections shown are exemplary and other means of establishing a communications link between the computers may be used.

In the description that follows, the subject matter of the present application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the present application is being described in the foregoing context, it is not meant to be limiting as those of skill in the art will appreciate that some of the acts and operation described hereinafter can also be implemented in hardware.

Figure 2:
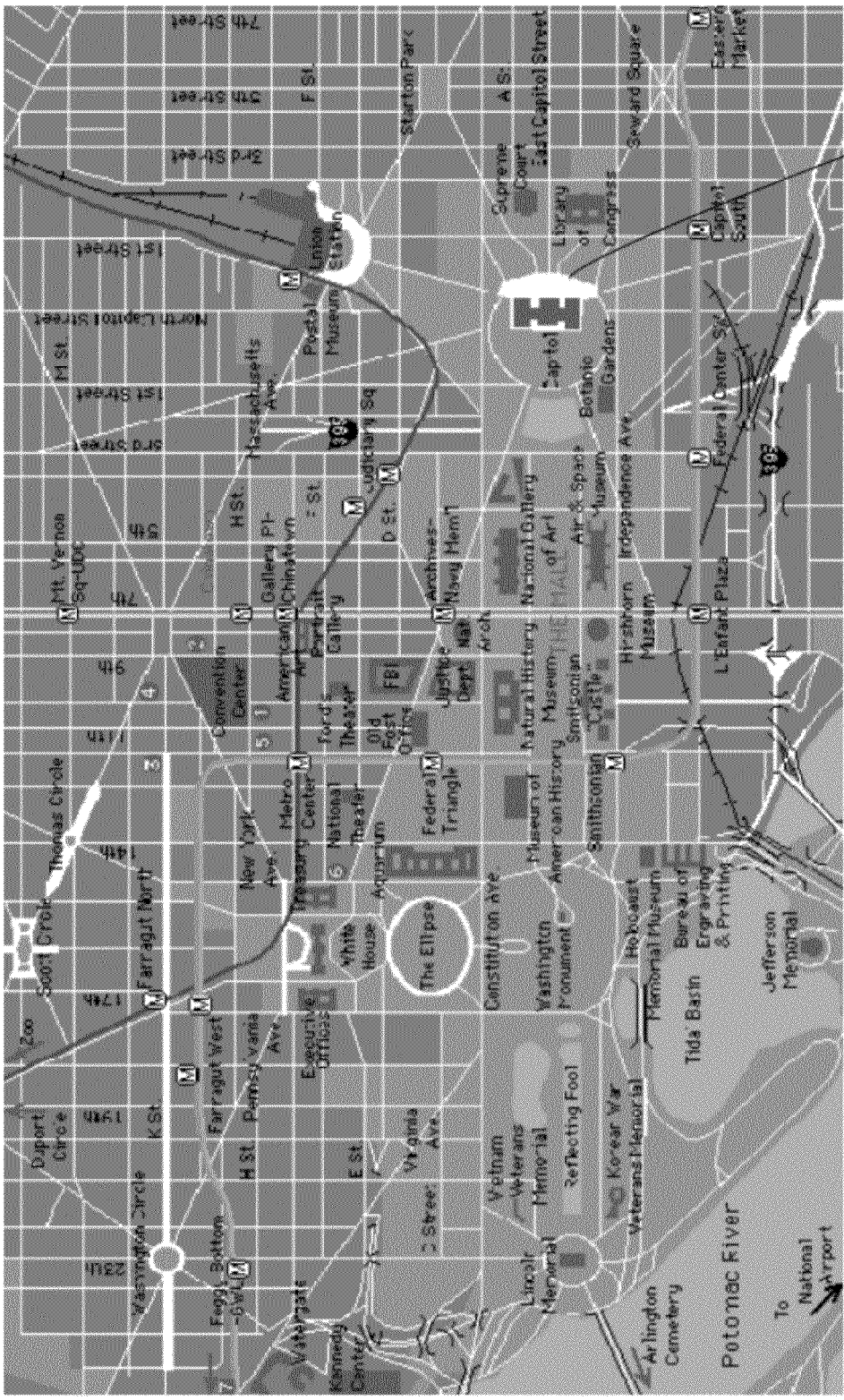
FIG. 2, labeled "related art" is a map of Washington D.C. illustrating an iconographic map in accordance with an embodiment of the subject matter of the present application.

Referring to FIG. 2, labeled "related art," a map is illustrated. The map illustrates a prior art iconographic map of Washington D.C. By clicking on the capitol 210, a new web page appears showing an image of the Capitol of the United States along with some interesting facts about the Capitol.

An embodiment is directed to providing an enhanced iconographic map for personal use that provides access to images associated with the icon on the map. Rather than a single image, the access can connect a user to a catalog of images associated with the icon. Moreover, the embodiment provides for an associated time line integrated with the map. The iconographic map of Washington D.C. provides a pictorial representation for any visitor to the Washington D.C. area. An embodiment is directed to a personalized iconographic map illustrating icons associated with a catalog of images that are incorporated with a time line. The time line can be associated with a trip taken to an area in a map such that scrolling the time line automatically causes images associated with that time appear as well as the location on the map wherein the picture was taken. More specifically, in an embodiment, the time and date a picture was taken can be included in metadata associated with an image file. Typically, such data is included when images are acquired via digital cameras. The metadata can be linked to the time line such that a table is accessed including the metadata. Metadata can include but is not limited to data that is used to describe other data. In some instances metadata can include but is not limited to a relational organization comparing data to other data or enhancing data via a database or other relational organization tool that describe the contents of other data and can be in the form of tables, files, fields, columns and other method of organizing data to best describe other data or files and the like.

Figure 3:
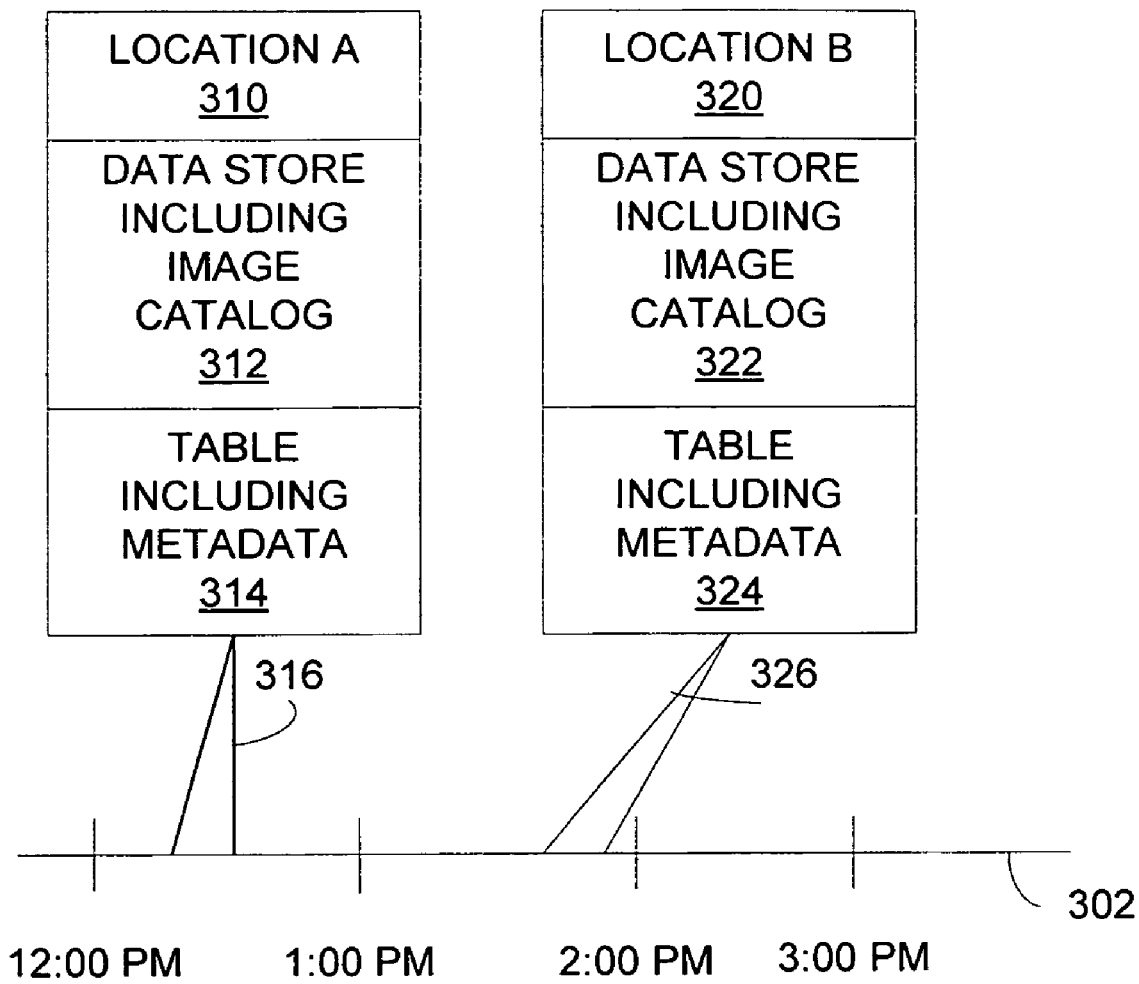
FIG. 3 is a block diagram illustrating how data could be arranged in accordance with an embodiment of the subject matter of the present application.

Referring now to FIG. 3, a block diagram illustrates one embodiment for storing images cataloged according to map location and a time line. In the embodiment, the images are stored organized according to location on the map. FIG. 3 illustrates a time line 302. Also illustrated is location A 310, with an associated data store which can be referred to as an image catalog 312 and a table that can be organized to hold metadata 314. Metadata 314 can be coupled to time line 302 via a pointer, link or other method as illustrated by lines 316 connecting metadata 314 to a time period between 12:00 PM and 1:00 PM. Also shown is location B 320 with image catalog 322 and metadata 324. Metadata 324 is coupled to time line 302 via lines 326 for a time period between 1:00 PM and 2:00 PM.

According to an embodiment, a user interface is provided that enables a mouse or other interface to interact with the time line 302 to instantiate the link connecting to metadata 314 and 324. More specifically, clicking on the area outlined by lines 316 instantiates the image catalog 312 and displays an appropriate time-related image at location A 310 on the map.

The embodiment shown in FIG. 3 can include or be operable with the computer system shown in FIG. 1 in accordance with the subject matter herein disclosed. More particularly, referring back to FIG. 1, mapping modules 36 and 46 illustrate configurable modules capable of being coupled to a processor and memory as shown. Thus, an embodiment is directed to a computer system such as that shown in FIG. 1. The computer system can include a processor, a memory coupled to the processor and a mapping module coupled to the memory as shown in FIG. 1, mapping modules 36 and 46. For purposes of the present application, a mapping module coupled to the memory can include but is not limited to a mapping module with all module components within the memory, a mapping module with only partially coupled to the memory and partially coupled to other components such as to firmware, and a memory module including only some components coupled to the memory and other components in another memory, such as RAM or ROM or a storage that can be manipulated.

The mapping module can include a data store configurable to organize one or more images according to locations on a map and also include a table. The table can be coupled to the data store and the table can be configurable to associate metadata for the one or more images with a time line, an image history and/or a location. The association can be configurable to enable an instantiation of a time-related image from one or more images at one or more locations of the map. In one or more embodiments, the table, metadata and other components of the mapping module can be configurable to be entirely or only partially within the memory. The association can enable an instantiation of time-related images from the one or more images at the locations on the map.

In one embodiment, the images can be received by a wireless connection to a public resource. After the images are received or otherwise collected, the images can be displayed on the map via icons. The icons can be key frame images representative of a location on the map and be configurable to provide access to the images.

Figure 4:
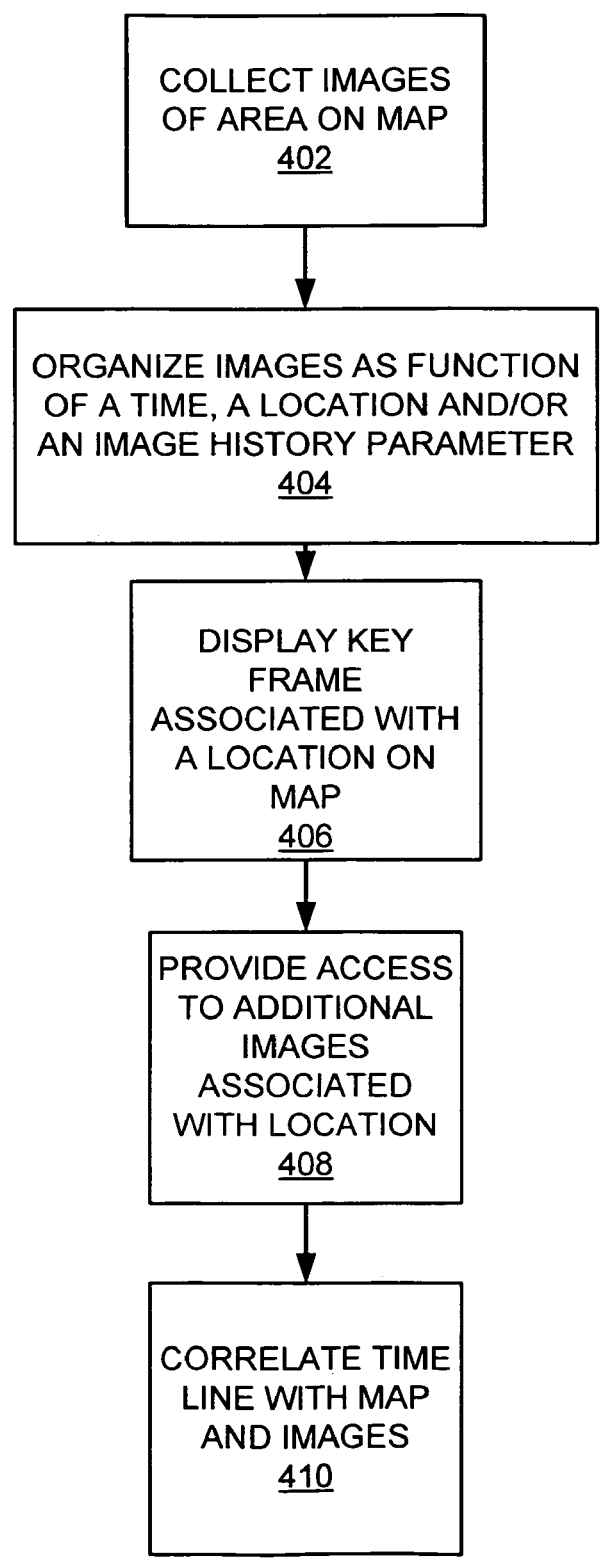
FIG. 4 is a flow diagram illustrating a method in accordance with an embodiment of the subject matter of the present application.

Referring now to FIG. 4, a flow diagram illustrates a method in accordance with an embodiment. More particularly, the embodiment is directed to a method for displaying images on a map. Block 402 provides for collecting images of a predetermined area on the map. Block 404 provides for organizing the images on the map as a function of a time, location and/or image history parameter. The function can include the time, location and/or image history parameter with respect to a location of a user of the map. More particularly, the organizing can include but is not limited to making images accessible first by a location on the map, and second according to a time when the image was taken. Thus, the organizing can result in a time line of the collected images. As described above with respect to FIG. 3, the organizing can include correlating metadata with each image with a position on a timeline. The images can be organized as icons displayed on the map. In one embodiment the organizing the images on the map as a function of a time, location and/or image history parameter can include causing the images to be organized by time and location and include enabling the images to be accessed via a time line. The organizing the images on the map can include designating at least one of the one or more images as a key frame associated with one or more locations on the map.

In another embodiment the organizing the images on the map as a function of a time, location and/or image history parameter can include causing the images to be organized by time and location and include enabling the map to be highlighted and/or panned via the time line. For example, the enabling the map to be highlighted and/or panned via the time line can include accepting input directing access of the map via panning. The images can be organized on the map as one or more icons displayed on the map. Thus, the highlighting and/or panning the time line can cause highlighting of the icons on the map or causing pop-ups to display or the like.

In one embodiment, the images can be collected from public or private cameras, or from public and/or private resources. Further, the icon displayed on the map can be a key frame associated with a location on the map.

Block 406 provides for displaying a key frame representative of a location on the map. The key frame can be a link to provide access to at least one of the one or more images. Alternatively, the one or more additional images can be from the collected images with the link associated with the location on the map. The displaying a key frame image associated with a location on the map can also include providing accessibility to the one or more images via metadata. The metadata can be configurable to provide at least a time association. The association could include a time at which the one or more images are associated to enable display of the one or more images upon designating a position on the time line. Additionally, in an embodiment, the displaying a key frame image can include displaying the key frame at the location on the map. Block 440 provides for correlating a time line with the map and the collected images. More specifically, the time line can be coupled to the collected images such that scrolling and/or clicking the time line instantiates a display of an image on the map correlated to the time line via a user interface. The instantiating the display can include instantiating the display of one or more images and/or at least a portion of the map via the user interface.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified steps performed in the same or a different order.

We claim:

1. A computer system comprising:
    a processor;
    a memory coupled to the processor; and
    a mapping module coupled to the memory, the mapping module including:
        a data store configurable to organize multiple images according to one or more locations on a map, and
        a table coupled to the data store, the table configurable to associate metadata for the multiple images with a time line, an image history and a location, the association to enable an instantiation of time-related images from the multiple images at the one or more locations on the map in response to an instantiation of a curser positioned at different locations along an instantiation of the time line.

2. The computer system of claim 1 wherein the memory is configurable to receive the multiple images via a wireless connection to a public resource.

3. The computer system of claim 1 wherein the mapping module is configurable to cause a display of the multiple images on the map as one or more icons.

4. The computer system of claim 3 wherein the mapping module is configurable to instantiate one or more key frame images on the map as the one or more icons, the one or more key frame images representative of at least one of the one or more locations on the map.

5. The computer system of claim 4 wherein the memory includes instructions that when executed by the processor results in an instantiation of a first of the multiple images in response to the curser positioned a first position of the instantiation of the time line, and results in an instantiation of a second of the multiple images in response to the curser positioned a second position of the instantiation of the time line.

6. A computer system comprising:
    a processor;
    a memory coupled to the processor;
    a mapping module coupled to the memory, the mapping module including a data store configurable to collect one or more images of a predetermined area on a map, the data store configurable to store the one or more images as a function of a time line, a location or an image history parameter; and
    the data store configurable to store a table, the table configurable to associate metadata for the one or more images with one or more of: the time line, the image history parameter and the location, the association to enable an instantiation of a time-related image from the one or more images at the location on the map.

7. The computer system as recited in claim 6 further comprising:
    a module to enable an instantiation on a display of the time-related image from the one or more images at the one or more locations on the map in response to highlighting or panning an instantiation of the time line.

* * * * *